UNITED STATES PATENT OFFICE.

EBEN N. HORSFORD, OF CAMBRIDGE, MASSACHUSETTS.

IMPROVEMENT IN THE MANUFACTURE AND USE OF NEUTRAL SULPHITE OF LIME.

Specification forming part of Letters Patent No. 39,922, dated September 15, 1863.

*To all whom it may concern:*

Be it known that I, EBEN N. HORSFORD, of the city of Cambridge, in the county of Middlesex and State of Massachusetts, have invented a process for the manufacture of neutral sulphite of lime, by means of which I have been enabled to greatly improve the process of preserving saccharine juices against fermentation; and I declare the following to be a full and exact description of the same.

The nature of my invention consists in the production of a dry, pulverulent, perfectly-neutral sulphite of lime, and in the use of this substance for the preservation of cider, wine, and other juices containing fermentable saccharine matter.

Several years ago the Massachusetts Horticultural Society published a process for preserving cider, which I had communicated to that institution, and in which the moist sulphite of lime in use for neutralizing chlorine was to be added to the cider to arrest its fermentation at the precise stage in which the taste and flavor were most acceptable. To meet the demand arising from the publication of this process numerous persons advertised the sulphite of lime for sale; but so imperfectly had the nature of the changes taking place in the cider been comprehended that some sold and many purchased and used sulphate instead of sulphite of lime. Others procured and used sulphide of calcium. Others still used simple quicklime. When these facts are considered, it is not to be wondered at that there were failures to produce good cider, even among those who supposed they were following the suggestions contained in the published article referred to. There were, moreover, difficulties in the preparation of sulphite of lime on a large scale, and in the use of it in preserving saccharine juices which my limited experience at the time of the publication referred to had not wholly revealed. The article in general use is a pasty preparation of sulphite of lime and water, sometimes acid, sometimes alkaline, and very rarely neutral. Another article in common use is an air-dried preparation, sometimes neutral, but more frequently acid or alkaline, and containing variable quantities of sulphate of lime and of water, according to the state of the atmosphere in which it was prepared. It has occasionally happened in the preservation of cider, wine, &c., that, owing to the neglect to draw off the clear liquid after the precipitation of the albuminous matter with the sulphite of lime, the cider has become more or less charged with hydrosulphuric acid, rendering the taste exceedingly offensive. It has also happened on exceedingly rare occasions that, owing to some imperfection in the manufacture, the pasty preparation, on being added to cider, gave off hydrosulphuric acid. Both the wet and air-dried preparations, when alkaline, yield to acid cider an acetate of lime, which imparts a bitter taste to the cider. When the sulphite of lime is acid from excess of sulphurous acid, the cider tastes of sulphurous acid. In view of these various considerations, and to protect the public from annoyance arising from imperfections of manufacture and the sale of worthless preparations, I have sought to improve the manufacture of the sulphite, so as to make its strength uniform and produce it in the exact form in which it should be presented to the cider—that of a dry, perfectly-neutral sulphite and as slightly soluble as possible. In this form there can be no disengagement of sulphurous acid and no formation of the bitter acetate of lime, and with proper attention to the separation of the albuminous deposit following the addition of the sulphite no development of hydrosulphuric acid, and, indeed, no change except the conversion of the insoluble sulphite into the insoluble sulphate.

To produce the dry neutral sulphite of lime, sulphurous acid is conducted over the surface of milk of lime kept in constant agitation. When the emulsion is supersaturated, it is withdrawn, thoroughly drained, and spread out to dry to within about twenty-five per cent. of absolute dryness. I then crumble and rasp it through a sieve of about sixty-four meshes to the square inch. I then subject it, with constant stirring, to a current of hot carbonic acid, to remove the moisture while excluding the air, which would tend to convert the sulphite into inert sulphate of lime. In this process any surplus sulphurous acid is repelled into the water.

The apparatus for drying in an atmosphere of carbonic acid, which I have found convenient, consists of a cylinder in which is a carrier such as is employed for moving flour horizontally in a flouring-mill, through which carbonic acid and more or less carbonic oxide from a coal-fire are conducted in a direction opposite to that of the moving powder. I have also dried it in a closely-covered but not airtight vessel, applying heat to repel the moisture, as in the preparation of calcined plaster-of-paris; but I prefer the former method. The evolved moisture driving the air out prevents the conversion of the sulphite into sulphate of lime. When the powder is dry, I pass it through a mill and bolt it, after which it is ready for use.

The thorough drying renders the sulphite less soluble. It gives it in some degree the quality of calcined plaster, which enables it more effectually to carry down the albuminous matter. In the condition of fine powder its action is prompt. In its neutral condition, with proper attention, it will impart no taste to cider.

I do not claim the use of sulphite of lime as hitherto prepared and employed for the preservation of saccharine juices against fermentation; but I have made an improvement which not only makes the action of the sulphite more uniform and sure, but prevents it, when properly used, from imparting objectionable taste to the saccharine juices; and

What I claim is—

1. Depriving sulphite of lime of its incidental and constitutional water by heat.

2. Depriving sulphate of lime of its incidental and constitutional water in a space from which oxygen gas is nearly or quite excluded.

3. The use of dry neutral sulphite of lime to arrest the fermentation of saccharine juices.

E. N. HORSFORD.

Witnesses:
　CHAS. S. MERRICK,
　GEO. F. WILSON.